US010520077B2

(12) United States Patent
Hessel

(10) Patent No.: US 10,520,077 B2
(45) Date of Patent: Dec. 31, 2019

(54) GEAR SELECTOR SHIFT LEVER DEVICE, GEAR SELECTOR SHIFT LEVER ARRANGEMENT FOR A VEHICLE, AND METHOD FOR SECURING A GEAR SELECTOR SHIFT LEVER DEVICE

(71) Applicant: ZF Friedrichshafen AG, Friedrichshafen (DE)

(72) Inventor: Alex Hessel, Lemförde (DE)

(73) Assignee: ZF Friedrichshafen AG, Friedrichshafen (DE)

(*) Notice: Subject to any disclaimer, the term of this patent is extended or adjusted under 35 U.S.C. 154(b) by 261 days.

(21) Appl. No.: 15/320,948

(22) PCT Filed: Jun. 9, 2015

(86) PCT No.: PCT/EP2015/062795
§ 371 (c)(1),
(2) Date: Dec. 21, 2016

(87) PCT Pub. No.: WO2016/000917
PCT Pub. Date: Jan. 7, 2016

(65) Prior Publication Data

US 2017/0175879 A1 Jun. 22, 2017

(30) Foreign Application Priority Data

Jul. 2, 2014 (DE) ........................ 10 2014 212 774

(51) Int. Cl.
*F16H 59/02* (2006.01)
*B60K 20/02* (2006.01)

(52) U.S. Cl.
CPC ......... *F16H 59/0278* (2013.01); *B60K 20/02* (2013.01); *F16H 2059/026* (2013.01)

(58) Field of Classification Search
CPC ... B60K 20/02; B60K 20/04; F16H 2059/026; F16H 59/0278; G05G 1/04; G05G 23/00; G05G 25/00; F16B 2/18
(Continued)

(56) References Cited

U.S. PATENT DOCUMENTS 908,542 A * 1/1909 Broluska ............... F16B 39/284 411/277
1,577,011 A * 3/1926 Walker .................. B60R 25/007 70/204
(Continued)

FOREIGN PATENT DOCUMENTS

DE 3210319 C1 10/1983
DE 2735035 C2 10/1986
(Continued)

OTHER PUBLICATIONS

German Office Action dated Mar. 23, 2015 for German Patent Application No. DE 10 2014 212 774.2 (German language), 7 pages.
(Continued)

*Primary Examiner* — Jake Cook
*Assistant Examiner* — T. Scott Fix
(74) *Attorney, Agent, or Firm* — Brinks Gilson & Lione

(57) ABSTRACT

A gear selection shift lever device for a vehicle is presented, which comprises a housing and an attachment device connected to the housing, wherein the housing has a cover surface, on which a shift lever can be or is disposed, and wherein the attachment device connected to the housing has a shaft and an eccentric disk coupled to the shaft, wherein a center of the eccentric disk lies outside the shaft axis of the shaft, wherein the attachment device is designed to connect the gear selection shift lever device to a mount for the gear selection shift lever device that can be or is attached to the
(Continued)

100 104 114 108 102 144 142 134 vehicle, when the eccentric disk is moved about the shaft axis.

14 Claims, 4 Drawing Sheets

(58) Field of Classification Search
USPC .... 74/473.1, 473.23, 473.33, 522, 525, 548; 70/204
See application file for complete search history.

(56) References Cited

U.S. PATENT DOCUMENTS

| | | | | |
|---|---|---|---|---|
| 2,293,197 | A * | 8/1942 | Dorr | B60R 25/066 70/202 |
| 2,782,957 | A * | 2/1957 | Imparato | F16B 2/18 220/23.4 |
| 5,040,434 | A | 8/1991 | Behrens | |
| 5,211,078 | A * | 5/1993 | McCarthy | B60K 20/02 180/272 |
| 5,950,493 | A | 9/1999 | Pritchard | |
| 6,418,760 | B1 * | 7/2002 | Fettes | A45C 13/1053 24/167 |
| 8,196,491 | B2 * | 6/2012 | Wilson | F16H 59/0204 74/473.18 |
| 2002/0136598 | A1 * | 9/2002 | Feng | A63B 25/08 403/322.4 |
| 2002/0172549 | A1 * | 11/2002 | Koros | F16M 13/022 403/322.4 |
| 2005/0207863 | A1 * | 9/2005 | Ateca | F16B 2/18 411/43 |
| 2008/0135704 | A1 | 6/2008 | Schuler | |
| 2008/0314186 | A1 * | 12/2008 | Ford | B60K 20/04 74/473.23 |
| 2014/0331805 | A1 * | 11/2014 | Yang | F16H 59/04 74/473.33 |
| 2015/0226244 | A1 * | 8/2015 | Likosar | A63C 11/02 24/495 |
| 2016/0178051 | A1 * | 6/2016 | Hwang | F16H 59/105 74/473.23 |
| 2017/0089453 | A1 * | 3/2017 | Park | F16H 59/10 |

FOREIGN PATENT DOCUMENTS

| | | | |
|---|---|---|---|
| DE | 4303310 | A1 | 9/1993 |
| DE | 19743375 | A1 | 4/1998 |
| DE | 10004407 | A1 | 8/2000 |
| DE | 19953958 | A1 | 5/2001 |
| EP | 1150021 | A2 | 10/2001 |

OTHER PUBLICATIONS

English translation of p. 7 of German Office Action dated Mar. 23, 2015 for German Patent Application No. DE 10 2014 212 774.2 (2 pages).

International Search Report and Written Opinion dated Aug. 19, 2015 for PCT/EP2015/062795 (German language, 9 pages).

International Search Report dated Aug. 19, 2015 for PCT/EP2015/062795 (English language, 3 pages).

* cited by examiner

GEAR SELECTOR SHIFT LEVER DEVICE, GEAR SELECTOR SHIFT LEVER ARRANGEMENT FOR A VEHICLE, AND METHOD FOR SECURING A GEAR SELECTOR SHIFT LEVER DEVICE

RELATED APPLICATIONS

This application is a filing under 35 U.S.C. § 371 of International Patent Application PCT/EP2015/062795, filed Jun. 9, 2015, and claims the benefit and priority of German Patent Application DE 10 2014 212 774.2, filed Jul. 2, 2014, both of which are incorporated by reference herein in their entirety.

BACKGROUND

1. Technical Field

The present invention relates to a gear selection shift lever device for a vehicle, a corresponding gear selection shift lever assembly, and a method for attaching a gear selection shift lever device for a vehicle.

2. Background Information

A motor vehicle has numerous components that have to be installed in the production thereof, or replaced for servicing and maintenance purposes. Screw connections, together with further fastening elements, are often used thereby.

A shifting device attached in a fixed manner in a motor vehicle for actuating a gearwheel shifting transmission is presented in the patent application DE 199 53 958 A1, wherein the connection between the motor vehicle and the gearshift device comprises a mount.

BRIEF SUMMARY

With this background, the present invention creates an improved gear selection shift lever device for a vehicle, a corresponding gear selection shift lever assembly, which comprises the gear selection shift lever device, and an improved method for attaching a gear selection shift lever device for a vehicle on a mount for the gear selection shift lever device in accordance with the independent claims. Advantageous designs can be derived from the dependent claims and the following description.

Using an eccentric disk, a gear selection shift lever device for a mechanical actuation of a motor vehicle transmission can be implemented, which can be mounted with a simple construction in an inexpensive and efficient manner.

An eccentric disk can be used as a reliable and easily adjustable attachment means for a gear selection shift lever device, in order to create a force-fitting, and additionally or alternatively a form-fitting connection between the gear selection shift lever device and a mount for the gear selection shift lever device. In accordance with different embodiments, the connection can be created directly through the eccentric disk, or by using an additional attachment element, which can be moved in a translatory manner when the eccentric disk rotates, in order to create the connection between the gear selection shift lever device and the mount for the gear selection shift lever device.

A gear selection shift lever device for a vehicle comprises the following features: a housing having a cover surface, on which a shift lever can be or is disposed; and an attachment device connected to the housing, having a shaft and an eccentric disk coupled to the shaft, wherein a center of the eccentric disk lies outside a shaft axis of the shaft, and wherein the attachment device is designed to connect the gear selection shift lever device with a mount for the gear selection shift lever device that can be or is connected to the vehicle, when the eccentric disk is moved about the shaft axis.

The gear selection shift lever device can be a mechanical gear selection shift lever device. The gear selection shift lever device preferably comprises a shift lever, which can be constructed comparably simply in a single piece. The shift lever can be hinged at the bottom to an end of a shift rod of a motor vehicle transmission. The shift lever can represent a gearshift knob that can be actuated by a user, or it can serve as a mounting element for such a gearshift knob. The mount can be designed as a frame, and substantially encompass the gear selection shift lever device when installed. The mount can have a shape thereby, into which the gear selection shift lever device can be placed or inserted. Using the attachment device, a force-fitting, and additionally or alternatively form-fitting connection can be created between the gear selection shift lever device and the mount. An eccentric disk can be understood to be a clamping eccentric. An attachment device can be understood to be a quick-clamping device. The mount can be understood to be a support.

The attachment device can have an eccentric-actuation lever coupled to the shaft, which is designed to move the eccentric disk about the shaft axis when the eccentric actuation lever is actuated. Advantageously, due to the use of an eccentric actuation lever, there is no need to use an additional tool for installation.

The eccentric actuation lever can be designed such that it can pivot as a result of the actuation, between an open position, oriented substantially parallel to the cover surface, and a clamping, closed position, oriented substantially transverse to the cover surface. The eccentric actuation lever can be pivoted manually thereby. When in the clamping, closed position, the eccentric actuation lever can be oriented in a direction substantially opposing the shift lever. As such, a movement of the eccentric actuation lever over approximately 90° can bring it from the open position into the clamping, closed position, wherein the eccentric actuation lever can be disposed, when in the closed state, i.e., in the clamping, closed position, such that it is not disruptive, and is beyond the reach of a driver or operator of the vehicle.

It is also beneficial when the attachment device comprises a further eccentric disk coupled to the shaft. A center of the eccentric disk may lie outside the shaft axis of the shaft thereby. The eccentric disks can be disposed on opposing sides of the housing. The eccentric disks can be designed to engage in grooves in the mount. By this means, the gear selection shift lever device can be connected to the mount at two points. In order to create numerous clamping points on the mount, the attachment device can have numerous eccentric disks, which in turn can be connected to a connecting rod. The eccentric actuation lever can function as a connecting rod.

The housing can have a projection on an end surface adjoining the cover surface. The eccentric disk and a first sub-shaft of the shaft, coupled to the eccentric disk, can be disposed on a first side of the projection. The further eccentric disk and a second sub-shaft of the shaft, coupled to the further eccentric disk, can be disposed on a second side of the projection, lying opposite the first side. The eccentric actuation lever can encompass the projection. The eccentric actuation lever can be coupled to the one eccentric disk via the first sub-shaft. The eccentric actuation lever can be coupled to the further eccentric disk via the second sub-shaft. The first sub-shaft and the second sub-shaft can be coupled to one another via a connecting rod. The shaft can be inserted through a hole in the projection thereby. Alternatively, the first sub-shaft and the second sub-shaft can be coupled indirectly, or not at all, and the shaft can be divided by the projection.

The attachment device can have at least one attachment pin. The eccentric disk can be designed to move the attachment pin transverse to the shaft axis in a linear manner, in order to move one end of the attachment pin into a recess in the mount. When the attachment pin is moved into the recess, the gear selection shift lever device can be connected to the mount. The recess can be designed as a bore hole or a blind hole. The recess can be designed for a form-fitting reception of the end of the attachment pin. Advantageously, the attachment pin can create a form-fitting connection of the gear selection shift lever device, or the attachment device, respectively, with mount.

Furthermore, the attachment device can have at least one further attachment pin. The eccentric disk can be designed thereby to move the other attachment pin transverse to the shaft axis, in a linear manner, in a direction opposite the direction of movement of the one attachment pin, in order to move an end of the other attachment pin into another recess in the mount. By this means, the gear selection shift lever device can be connected to the mount.

Thus, the attachment device can be designed to move the two attachment pins in two opposing directions starting from the eccentric disk, when the eccentric disk is rotated. Thus, a rotational movement of the eccentric disk can be transformed into translational movements of the one attachment pin and the further attachment pin in two opposing directions.

The housing can have at least one latching element, which is designed to latch into a complementary latching element of the mount, in order to connect the mount to the gear selection shift lever device in a form-fitting manner, in a direction substantially perpendicular to the cover surface. The gear selection shift lever device can have at least one latching element, which is designed to engage in a complementary latching element of the mount, in order to connect the mount to the gear selection shift lever device in a form-fitting manner. The one latching element, or alternatively, the complementary latching element, can be designed in the form of a pin, and, additionally or alternatively, a projection. The respective corresponding latching element can be designed as a recess, groove or bore hole. Advantageously, a form-fitting connection can thus be created, perpendicular to the cover surface of the housing. The housing can also have at least one second latching element thereby. As a result the housing can be connected to the mount at least two points, in a form-fitting manner.

The latching element and the attachment device can be disposed on two opposing end surfaces of the housing. In this manner, the housing can be retained on one side by means of the latching element, and a force-fitting and, additionally or alternatively form-fitting connection can be created between the housing and the mount on the opposing side by means of the attachment device. In this manner, the housing can be connected to the mount at least three points, preferably at least four points. When the cover surface is substantially rectangular, the housing, or the gear selection shift lever device, respectively, can be connected to the mount in the regions of the four corners of the cover surface.

A gear selection shift lever assembly for a vehicle comprises a variation of a gear selection shift lever device presented herein, and a corresponding mount, wherein the gear selection shift lever device can be or is connected to the mount by means of the attachment device.

A method for attaching the gear selection shift lever device for a vehicle to a mount for the gear selection shift lever device comprises the following steps: Provision of a variation of the gear selection shift lever device presented herein and provision of a variation of the mount presented herein; and movement of the eccentric disk of the gear selection shift lever device about the shaft axis in order to attach the gear selection shift lever device to the mount.

In the movement step, the gear selection shift lever device can be connected to the mount in a force-fitting manner, and additionally or alternatively in a form-fitting manner. As a result, a secure connection between the gear selection shift lever device and the mount can be obtained.

The fundamental object of the invention can also be quickly and efficiently achieved through this variation of the invention, taking the form of a method for attaching the gear selection shift lever device to the mount.

BRIEF DESCRIPTION OF THE DRAWINGS

The invention shall be explained in greater detail in an exemplary manner, based on the attached drawings. Therein.

DETAILED DESCRIPTION OF THE DRAWINGS AND THE PRESENTLY PREFERRED EMBODIMENTS

In the following description of preferred exemplary embodiments of the present invention, identical or similar reference symbols shall be used for the elements depicted in the various figures having similar functions, wherein the description of these elements shall not be repeated.

Figure 1:
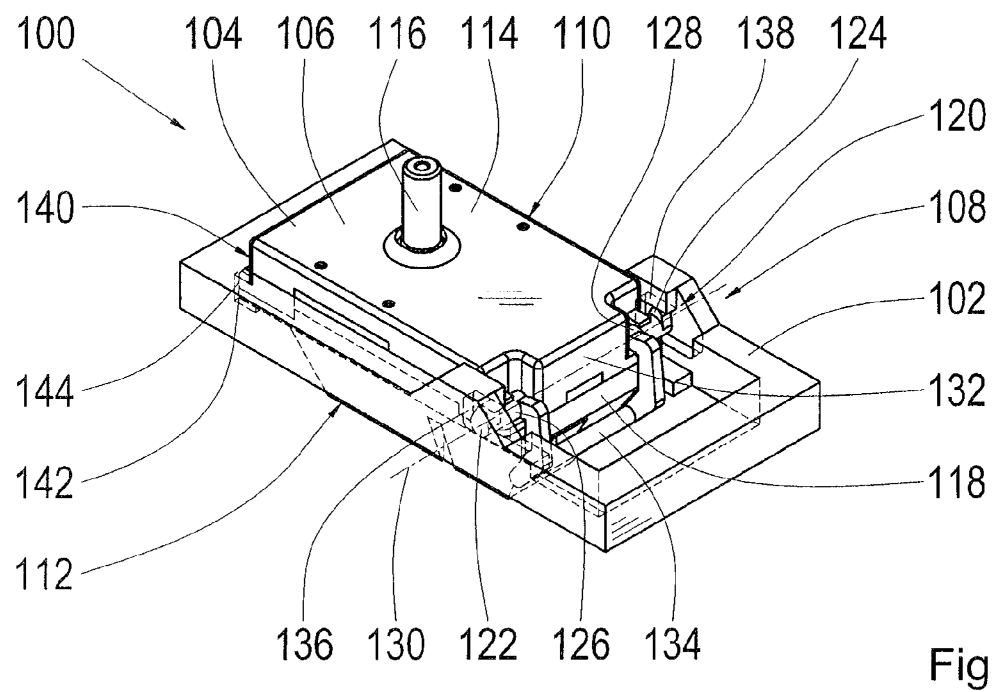
FIG. 1 shows a schematic, perspective illustration of a gear selection shift lever assembly for a vehicle according to an exemplary embodiment of the present invention.

FIG. 1 shows a schematic, perspective illustration of a gear selection shift lever assembly 100 for a vehicle according to an exemplary embodiment of the present invention. The gear selection shift lever assembly 100 comprises a mount 102 and a gear selection shift lever device 104 having a housing 106 and an attachment device 108 connected to the housing. The housing 106 according to this exemplary embodiment has, by way of example, an upper housing shell 110 and a lower housing shell 112. A shift lever 116 or a mount for the shift lever 116 is disposed on a cover surface

114 of the housing 106. The basic shape of the housing 106 is substantially rectangular. The upper housing shell 110 comprises the cover surface 114. The attachment device 108 is disposed on a first end surface 118 of the gear selection shift lever device 104 adjoining the cover surface 114.

The attachment device 108 comprises a first eccentric disk 122 and a second eccentric disk 124 on a shaft 120. The first eccentric disk 122 is coupled thereby to a first sub-shaft 126 of the shaft 120. The second eccentric disk 124 is coupled to a second sub-shaft 128 of the shaft 120. A center of the first eccentric disk 122 and a center of the second eccentric disk 124 lie outside a shaft axis 130 of the shaft 120. The housing 106 has a projection 132 on the first end surface 118. The first sub-shaft 126, coupled to the first eccentric disk 122, is disposed on a first side of the projection 132. The second sub-shaft 128, coupled to the second eccentric disk 124, is disposed on a second side of the projection 132. Furthermore, the attachment device 108 has an eccentric actuation lever 134. The eccentric actuation lever 134 is coupled to the first sub-shaft 126 and the second sub-shaft 128.

In the exemplary embodiment shown in FIG. 1, the eccentric actuation lever 134 comprises a first lever arm, which is coupled to the first sub-shaft 126, a second lever arm, which is coupled to the second sub-shaft 128, and a connecting piece, which connects the first lever arm to the second lever arm of the eccentric actuation lever 134. The eccentric actuation lever 134 encompasses the projection 132 of the housing 106. The first lever arm, the second lever arm, and the connecting piece form a type of connecting rod between the first sub-shaft 126 and the second sub-shaft 128.

The eccentric actuation lever 134 is designed to move the eccentric disks 122, 124 around the shaft axis 130 when the eccentric actuation lever 134 is actuated. The eccentric actuation lever 134 is designed to rotate the eccentric disks 122, 124, at least in part, about the shaft 120. The eccentric actuation lever 134 can be manually pivoted thereby, between an open position, oriented substantially parallel to the cover surface 114, and a clamping, closed position, oriented substantially transverse to the cover surface. The eccentric actuation lever 134 is shown in the clamping, closed position in FIG. 1. The possible rotation of the eccentric actuation lever 134 describes a quarter circle between the open position and the closed position, or, in other words, an angle of 90°, plus a potential tolerance range. In one exemplary embodiment, the tolerance range is ±10°, ±20° or ±30°.

The eccentric disks 122, 124 are disposed, as described above, on two opposing sides of the housing 106. The eccentric disks 122, 124 are furthermore designed to engage in two grooves 136, 138 of the mount 102.

At least one latching element 142 is disposed on a second end surface 140 of the gear selection shift lever device 104 lying opposite the attachment device 108. In other words, the second end surface 140 is shaped such that it forms a latching element 142. The second end surface 140 is disposed on a second end surface 144 of the housing 106, lying opposite the first end surface 118, and is thus connected at an edge to the cover surface 114. The latching element 142 is designed as a pin 142 or a projection 142 in the present exemplary embodiment. The mount 102 has a complementary latching element 144 to the latching element 142. The latching element 142 is designed to latch into the complementary latching element 144 of the mount 102, in order to connect the mount 102 to the gear selection shift lever device 104 in a form-fitting manner. Movement substantially perpendicular to the extension plane of the cover surface 114 is prevented thereby. Thus, the at least one latching element 142 and the attachment device 108 are disposed on two opposing end surfaces 118, 140.

In an exemplary embodiment not shown herein, the complementary latching element 144 disposed on the mount 102 is designed as a pin 144 or a projection 144. In this case, the latching element 142 disposed on the second end surface 140 of the gear selection shift lever device 104 is designed to receive the complementary latching element 144, or to latch therein.

The mounting device 102 is in the shape of a frame. The complementary latching element 144 is formed on a first inner surface of the mount 102. A groove 136, 138 is formed in each of the two adjoining inner surfaces of the mount 102, for receiving the corresponding eccentric disk 122, 124. A fourth inner surface of the frame, connecting the two latter inner surfaces, has no other function than that of a connecting element.

In the exemplary embodiment shown in FIG. 1, the eccentric disk 122 has the shape of an egg. In exemplary embodiments not shown herein, the contour of the eccentric disk 122 is circular or oval.

Figure 2:
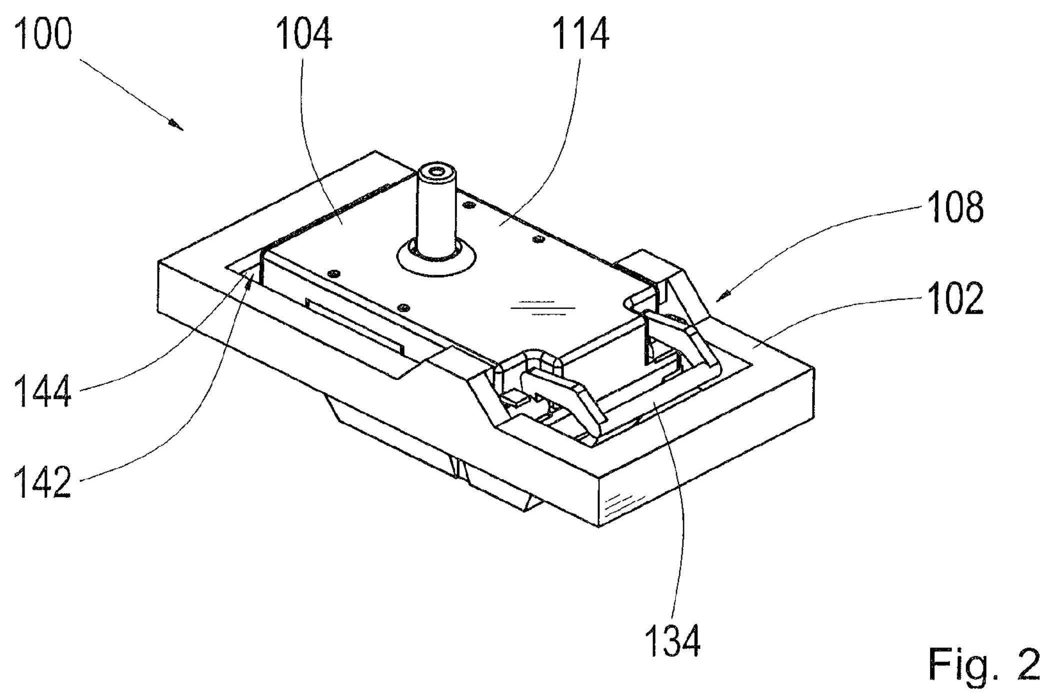
FIG. 2 shows a schematic depiction of a gear selection shift lever assembly in an uninstalled state according to an exemplary embodiment of the present invention.

FIG. 2 shows a schematic depiction of a gear selection shift lever assembly 100 in an uninstalled state according to an exemplary embodiment of the present invention. The gear selection shift lever assembly 100 can be an exemplary embodiment of the gear selection shift lever assembly 100 shown in FIG. 1. The gear selection shift lever assembly 100 comprises a mount 102 and a gear selection shift lever device 104. The mount 102 depicts a frame, in which the gear selection shift lever device 104 can be disposed and connected to the mount 102. An eccentric actuation lever 1234 of an attachment device 108 of the gear selection shift lever device 104 is in an open position. Thus, the eccentric actuation lever 134 is oriented substantially parallel to a cover surface 114 of the gear selection shift lever device 104. The gear selection shift lever device 104 has a latching element 142 on an end surface, which is designed to latch in a latching element 144 that is complementary to the latching element 142, and to create a form-fitting connection between the gear selection shift lever device 104 and the mount 102. The attachment device 108 is disposed on an end surface of the gear selection shift lever device lying opposite the end surface having the latching element 142.

Figure 3:
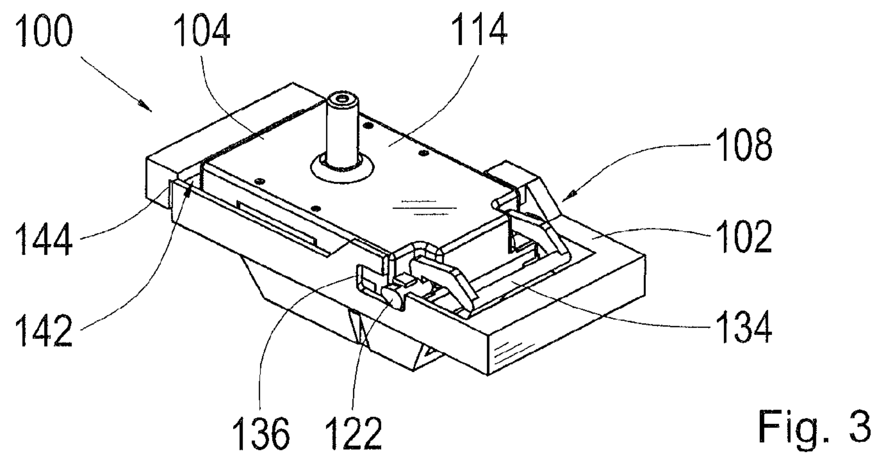
FIGS. 3 to 5 show a perspective view of a gear selection shift lever device and a mount according to an exemplary embodiment of the present invention.
Figure 4:
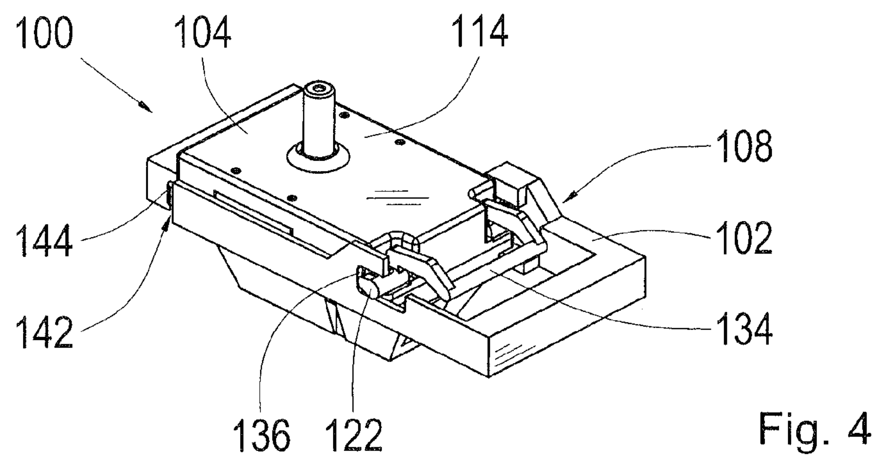
Figure 5:
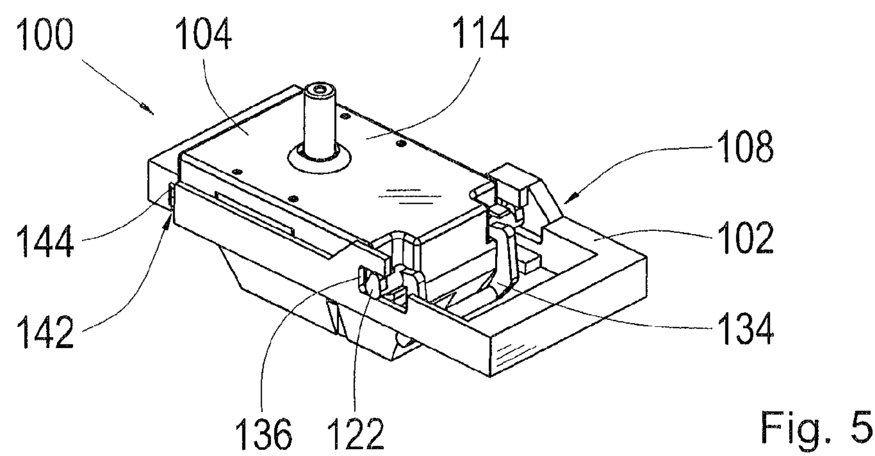

The following three figures, FIG. 3 to FIG. 5, show a gear selection shift lever assembly 100 according to an exemplary embodiment of the present invention. Thus, FIG. 3 to FIG. 5 show a perspective illustration of a gear selection shift lever device 104 and a mount 102 according to an exemplary embodiment of the present invention, wherein the three illustrations differ with respect to the position, or the connection, respectively, of the gear selection shift lever device 104 or an attachment device 108 with respect to the mount 102. In FIG. 3, the gear selection shift lever device 104 is loosely placed in the mount 102. An eccentric actuation lever 134 of the attachment device 108 of the gear selection shift lever device 104 is in an open position, i.e., substantially parallel to a cover surface 114 of the gear selection shift lever device 104. In FIG. 4, the gear selection shift lever device 104 is displaced in relation to the mount 102, in contrast to the illustration in FIG. 3, toward an end surface adjoining the cover surface 114, on which a latching element 142 is formed, such that the latching element 142 creates a form-fitting connection with a complementary latching element 144 formed in the mount 102, which is form-fitting in the direction transverse to the cover surface 114. The eccentric actuation lever 134 remains in the open position in FIG. 4, in comparison to FIG. 3. In contrast to FIG. 4, the eccentric actuation lever 134 in FIG. 5 is in a locking position, i.e., the eccentric actuation lever 134 is manually pivoted, with respect to FIG. 4, into a clamping, closed position oriented substantially transverse to the cover surface 114.

FIG. 3 shows a perspective illustration of a gear selection shift lever device 104 and a mount 102 according to an exemplary embodiment of the present invention. The gear selection shift lever device 104 and the mount 102 can be an exemplary embodiment of gear selection shift lever assembly 100 corresponding to that shown in FIG. 1 or FIG. 2, having a gear selection shift lever device 104 and a mount 102. The illustration corresponds substantially to the illustration in FIG. 2, with the difference that a frame of the mount 102 is thinner on the side facing the viewer, in order to make the groove 136 for the eccentric disk 122 visible.

FIG. 4 shows a perspective view of a gear selection shift lever device 104 that can be connected to a mount 102, according to an exemplary embodiment of the present invention. The mount 102 and the gear selection shift lever device 104 can be exemplary embodiments of one of the mounts 102 shown in the preceding figures, or a gear selection shift lever device 104 shown in the preceding figures, respectively. The illustration in FIG. 4 corresponds substantially to the illustration in FIG. 3, with the difference that the first eccentric disk 122 is disposed in the first groove 136 by means of a translatory movement of the gear selection shift lever device 104 toward the latching element 142. The eccentric actuation lever 134 remains in the open position. The latching element 142 of the gear selection shift lever device 104 that is not visible in FIG. 4 creates a form-fitting connection between the mount 102 and the gear selection shift lever device 104 with the complementary latching element 144 of the mount 102, likewise not shown therein.

FIG. 5 shows a perspective view of a gear selection shift lever device 104 connected to a mount 102 according to an exemplary embodiment of the present invention. The mount 102 and the gear selection shift lever device 104 can be exemplary embodiments of one of the mounts 102 shown in the preceding figures, or one of the gear selection shift lever devices 104 shown in the preceding figures, respectively. The illustration in FIG. 5 corresponds substantially to the illustration in FIG. 4, with the difference that the eccentric actuation lever 134 is oriented in a clamping, closed position. The eccentric disks 142, 124 are rotated approximately a quarter of a circle—in the clockwise direction in the illustration—in comparison to the illustration in FIG. 4, and create a force-fitting connection with the grooves 136, 138, respectively.

Figure 6:
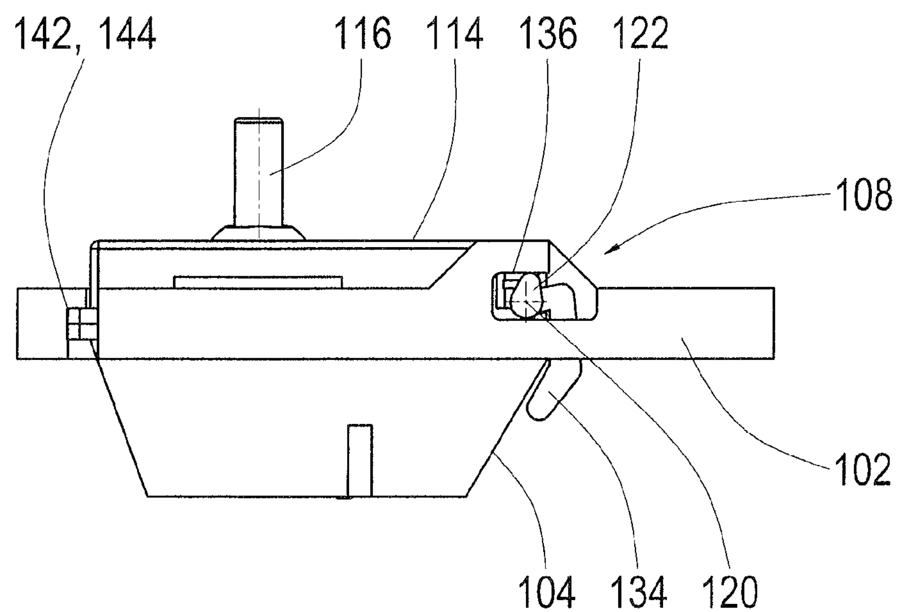
FIG. 6 shows a simplified side view of a gear selection shift lever device according to an exemplary embodiment of the present invention.

FIG. 6 shows a simplified side view of a gear selection shift lever device 104 according to an exemplary embodiment of the present invention. The gear selection shift lever device 104 can be an exemplary embodiment of one of the gear selection shift lever devices 104 shown in the preceding figures. The illustration in FIG. 6 corresponds substantially to the illustrations in FIG. 3 to FIG. 5, with the difference that the gear selection shift lever device 104 is depicted in a side view, wherein the illustration in FIG. 6 basically presents a sectional view in the region of the latching elements 142, 144.

A mount 116 for a shift lever is disposed such that it is perpendicular, on the cover surface 114 of the gear selection shift lever device 104. An attachment device 108 is disposed on a first end surface 118, which adjoins the cover surface 114. The attachment device 108 comprises a first eccentric disk 122, which is coupled to a shaft 120, wherein a center of the eccentric disk 122 lies outside a shaft axis of the shaft 120. The shaft access of the shaft 120 can be understood thereby to be a rotational axis of the shaft 120. An eccentric actuation lever 134 is coupled to the shaft 120 and thus to the eccentric disk 122. The eccentric disk 122 is disposed in a groove 136 of the mount 102.

Figure 7:
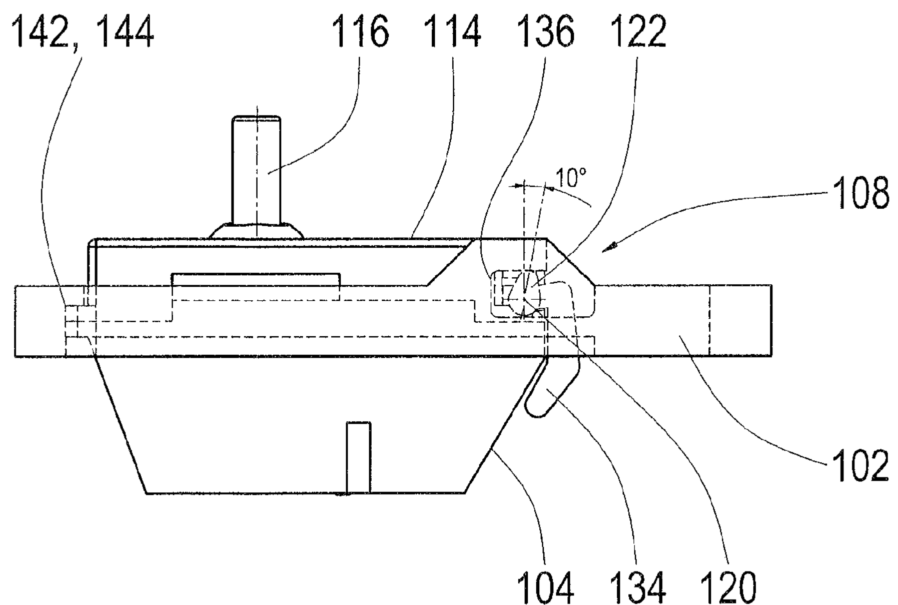
FIG. 7 shows a side view of a gear selection shift lever device according to an exemplary embodiment of the present invention.

FIG. 7 shows a side view of a gear selection shift lever device according to an exemplary embodiment of the present invention. The gear selection shift lever device 104 can be an exemplary embodiment of one of the gear selection shift lever devices 104 shown in the preceding figures. The illustration in FIG. 7 corresponds substantially to the illustration in FIG. 6, with the difference that the upper housing shell 110 and the lower housing shell 112 of the housing 106 of the gear selection shift lever device 104 can be discerned, because the mount 102 is illustrated in a basically transparent manner, or in a sectional view. The latching element 142 is formed by both the upper housing shell 110 and the lower housing shell 112. The attachment device 108 is disposed substantially on the upper housing shell 110. The cover surface 114 is a substantially planar surface in the illustrated exemplary embodiment.

A line 746 running through the center of the eccentric disk 122 and a rotational axis of the shaft 120 is oriented at an angle of 10° in relation to a line oriented perpendicular to the cover surface 116 or parallel to the mount 116. Thus, the eccentric disk 122 is moved 10° outward, over a maximum clamping position of the eccentric disk 122. As a result, the attachment device is secured against an unintended opening.

In an exemplary embodiment that is not shown, the attachment device is secured in the clamping, closed position against an unintended opening by means of a securing bracket or securing pin.

Figure 8:
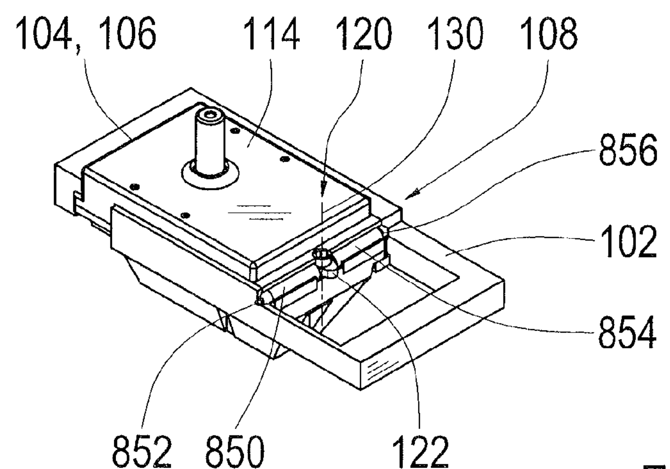
FIG. 8 shows a schematic 3D view of a gear selection shift lever device that can be connected to mount according to an exemplary embodiment of the present invention.

FIG. 8 shows a schematic 3D view of a gear selection shift lever device 104 that can be connected to a mount 102, according to an exemplary embodiment of the present invention. The gear selection shift lever device 104 and the mount 102 for the gear selection shift lever device 104 can be exemplary embodiments of a gear selection shift lever device 104 or a mount 102, respectively, shown and described in the preceding figures. The gear selection shift lever device 104 comprises a housing 106 having a cover surface 114, on which a shift lever can be disposed. Furthermore, the gear selection shift lever device 104 comprises an attachment device 108 connected to the housing 106, which is designed to connect the gear selection shift lever device 104 to the mount 102. The attachment device 108 comprises a shaft 120 ad at least one eccentric disk 122 coupled to the shaft 120. A center of the eccentric disk 12 lies outside the rotational axis of the shaft 120 thereby. The rotational axis of the shaft 120 is referred to as a shaft axis 130. The shaft axis 130 is oriented substantially transverse to the cover surface 114. Furthermore, the attachment device 108 comprises an attachment pin 850. The eccentric disk 122 is designed to move the attachment pin 850 linearly, in a direction transverse to the shaft axis 130, in order to move an end of the attachment pin 850 facing away from the eccentric disk 122 into a recess 852 in the mount 102. As a result, the gear selection shift lever device 104 is connected to the mount 102.

In the exemplary embodiment shown in FIG. 8, the attachment device 108 comprises at least one further attachment pin 854, which is designed to be moved linearly by the eccentric disk, in a direction transverse to the shaft axis 130, in the opposite direction of the movement of the other attachment pin 850, in order to move an end of the further attachment pin 854 facing away from the shaft axis 130 into a recess 856 in the mount 102, in order to connect the gear selection shift lever device 104 to the mount 102.

In an optional exemplary embodiment, the gear selection shift lever device 104 has at least one latching element, which is designed to latch into a complementary latching element of the mount 102. The latching element creates, together with the complementary latching element, a form-fitting connection between the gear selection shift lever device 104 and the mount 102.

In the exemplary embodiment shown in FIG. 8, the latching element and the attachment device 108 are disposed on two opposing end surfaces of the gear selection shift lever device 104.

Figure 9:
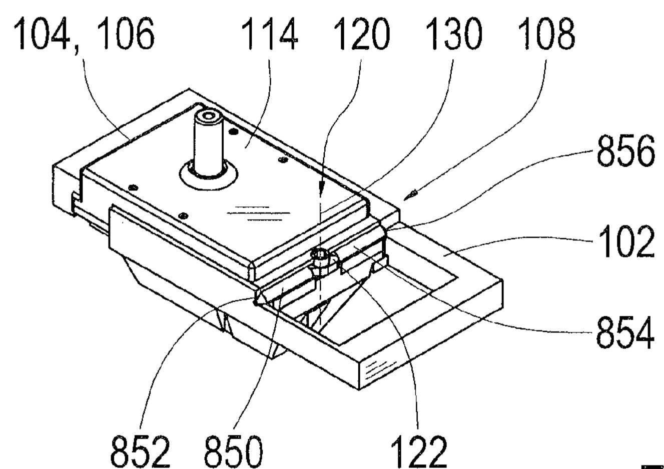
FIG. 9 shows a schematic 3D view of a gear selection shift lever device connected to a mount according to an exemplary embodiment of the present invention.

FIG. 9 shows a schematic 3D view of a gear selection shift lever device connected to a mount according to an exemplary embodiment of the present invention. The gear selection shift lever device 104 and the mount 102 for the gear selection shift lever device 104 can be exemplary embodiments of a gear selection shift lever device 104, or mount 102, respectively, shown and described in the preceding figures. The illustration substantially corresponds to the illustration in FIG. 8, with the difference that the first attachment pin 850 and the second attachment pin 854 are latched into the corresponding recesses 852, 856, and create a form-fitting connection between the gear selection shift lever device 104 and the mount 102. In addition, arrows indicate a direction of rotation for the eccentric disk 122 for connecting the gear selection shift lever device 104 and the mount 102, and a direction of movement for the first attachment pin 850 and the second attachment pin 854 resulting therefrom.

Figure 10:
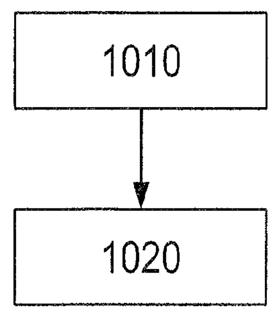
FIG. 10 shows a flow chart of a method for attaching a gear selection shift lever device for a vehicle to a mount for the gear selection shift lever device according to an exemplary embodiment of the present invention.

FIG. 10 shows a flow chart for a method for attaching a gear selection shift lever device for a vehicle to a mount for the gear selection shift lever device according to an exemplary embodiment of the present invention. The gear selection shift lever device and the mount can be exemplary embodiments of the gear selection shift lever device 104 or mount 102 shown and described in the preceding figures. The method for attaching a gear selection shift lever device for a vehicle to a mount for the gear selection shift lever device comprises a step 1010 for providing a variation of a gear selection shift lever device described in the preceding figures and providing a mount, and a step 1020, for moving the eccentric disk of the gear selection shift lever device about the shaft axis, in order to attach the gear selection shift lever device to the mount.

In an exemplary embodiment, in step 1020, the movement connects the gear selection shift lever device to the mount in a force-fitting manner, and additionally or alternatively in a form-fitting manner.

The exemplary embodiments described above and shown in the figures are selected only by way of example. Different exemplary embodiments can be combined with one another, either in their entirety or with respect to individual features. An exemplary embodiment can also be supplemented by features of another exemplary embodiment.

Furthermore, method steps according to the invention can be repeated, and executed in a sequence differing from that described above.

If an exemplary embodiment comprises an "and/or" conjunction between a first feature and a second feature, this can be read to mean that the exemplary embodiment according to one embodiment includes both the first feature as well as the second feature, and according to another embodiment, includes either just the first feature or just the second feature.

REFERENCE SYMBOLS

100 gear selection shift lever assembly
102 mount
104 gear selection shift lever device
106 housing
108 attachment device
110 upper housing shell
112 lower housing shell
114 cover surface
116 shift lever
118 first end surface
120 shaft
122 first eccentric disk
124 second eccentric disk
126 first sub-shaft
128 second sub-shaft
130 shaft axis
132 projection
134 eccentric actuation lever
136 first groove
138 second groove
140 second end surface
142 latching element
144 complementary latching element
746 line
850 attachment pin
852 recess
854 further attachment pin
856 further recess
1010 provision step
1020 movement step

What is claimed is:

1. A gear selection shift lever device for a vehicle, the gear selection shift lever device comprising:
- a housing comprising a cover surface fixed with respect to a shift lever; and
- an attachment device connected to the housing, the attachment device comprising a shaft and an eccentric disk coupled to the shaft;
- wherein a center of the eccentric disk lies outside a shaft axis of the shaft; and
- wherein the attachment device is configured to connect the gear selection shift lever device to a mount for the gear selection shift lever device when the eccentric disk is rotated about the shaft axis to move the attachment device into an engaged state from a disengaged state,
- wherein the shift lever is movable to select a gear of the vehicle when the attachment device is in the engaged state,
- wherein the attachment device comprises a second eccentric disk coupled to the shaft,
- wherein a center of the second eccentric disk lies outside the shaft axis of the shaft, and
- wherein the eccentric disk and the second eccentric disk are disposed and formed on opposing sides of the housing in order to engage in grooves in the mount.

2. The gear selection shift lever device of claim 1, wherein the attachment device has an eccentric actuation lever coupled to the shaft, which is configured to move the eccentric disk about the shaft axis when the eccentric actuation lever is actuated.

3. The gear selection shift lever device of claim 2, wherein the eccentric actuation lever is configured to pivot between an open position, and a clamping, closed position.

4. The gear selection shift lever device of claim 1, wherein the housing has a projection on an end surface adjoining the cover surface;
- wherein the eccentric disk and a first sub-shaft of the shaft coupled to the eccentric disk are disposed on a first side of the projection, and the second eccentric disk and a second sub-shaft of the shaft coupled to the second eccentric disk are disposed on a side of the projection lying opposite the first side; and wherein an actuation lever encompasses the projection and is coupled to the eccentric disk via the first sub-shaft and to the second eccentric disk via the second sub-shaft.

5. The gear selection shift lever device of claim 1 wherein the attachment device has at least one attachment pin; and wherein the eccentric disk is configured to move the attachment pin linearly, in a direction transverse to the shaft axis, in order to move an end of the attachment pin into a recess in the mount in order to connect the gear selection shift lever device to the mount.

6. The gear selection shift lever device of claim 5, wherein the attachment device has a second attachment pin; and wherein the eccentric disk is configured to move the second attachment pin linearly, in a direction transverse to the shaft axis, counter to a movement direction of the at least one attachment pin, in order to move an end of the second attachment pin into a further recess in the mount, in order to connect the gear selection shift lever device to the mount.

7. The gear selection shift lever device of claim 1 wherein the housing has a first latching element, which is configured to latch into a second latching element of the mount, in order to connect the mount to the gear selection shift lever device in a form-fitting manner.

8. The gear selection shift lever device of claim 7, wherein the first latching element and the second latching element are disposed on two opposing end surfaces of the housing.

9. The gear selection shift lever device of claim 2, wherein the housing has a projection on an end surface adjoining the cover surface;

wherein the eccentric disk and a first sub-shaft of the shaft coupled to the eccentric disk are disposed on a first side of the projection, and the second eccentric disk and a second sub-shaft of the shaft coupled to the second eccentric disk are disposed on a side of the projection lying opposite the first side; and wherein the eccentric actuation lever encompasses the projection and is coupled to the eccentric disk via the first sub-shaft and to the second eccentric disk via the second sub-shaft.

10. The gear selection shift lever device of claim 2, wherein the attachment device has at least one attachment pin; and wherein the eccentric disk is configured to move the attachment pin linearly, in a direction transverse to the shaft axis, in order to move an end of the attachment pin into a recess in the mount in order to connect the gear selection shift lever device to the mount.

11. The gear selection shift lever device of claim 10, wherein the attachment device has a second attachment pin; and wherein the eccentric disk is configured to move the second attachment pin linearly, in a direction transverse to the shaft axis, counter to a movement direction of the at least one attachment pin, in order to move an end of the second attachment pin into a further recess in the mount, in order to connect the gear selection shift lever device to the mount.

12. The gear selection shift lever device of claim 2, wherein the housing has at least one latching element, which is configured to latch into a complementary latching element of the mount, in order to connect the mount to the gear selection shift lever device in a form-fitting manner, in a direction substantially perpendicular to the cover surface.

13. The gear selection shift lever device of claim 3, wherein the housing has a first latching element, which is configured to latch into a second latching element of the mount, in order to connect the mount to the gear selection shift lever device in a form-fitting manner, in a direction substantially perpendicular to the cover surface.

14. The gear selection shift lever device of claim 13, wherein the first latching element and the second latching element are disposed on two opposing end surfaces of the housing.

* * * * *